Nov. 13, 1928.

R. BERGE 1,691,512

FASTENING DEVICE FOR ADJUSTABLE SKI EARS

Filed Nov. 26, 1926

R. Berge, inventor

By: Marks & Clerk
Attys.

Patented Nov. 13, 1928.

1,691,512

UNITED STATES PATENT OFFICE.

RASMUS BERGE, OF OSLO, NORWAY, ASSIGNOR TO A. GRESVIG, OF OSLO, NORWAY.

FASTENING DEVICE FOR ADJUSTABLE SKI EARS.

Application filed November 26, 1926, Serial No. 150,973, and in Norway November 28, 1925.

This invention has for its object to provide a fastening device for adjustable ski-ears, permitting an easy and sufficient displacement of the ski-ears to correspond to the different sizes and shapes of boots without necessitating the boring of additional screw-holes in the skis.

A preferred form of the invention is illustrated in the accompanying drawing, in which.

Figure 1:
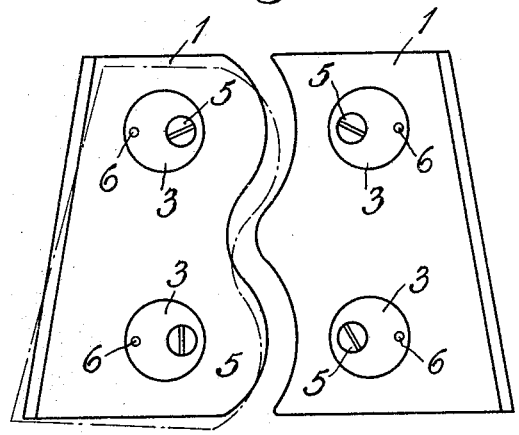
Figure 1 shows a pair of ski-ears, provided with the fastening device forming the present invention.
Figure 3:
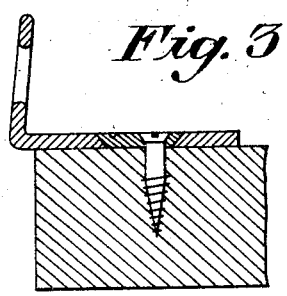
Fig. 3 is a transverse sectional view of a modification.
Figure 2:
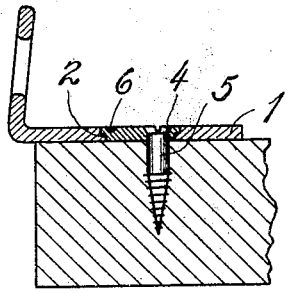
Figure 2 is a sectional view of one of the ears.

In the toe-plates —1— of the ski-ears a number of circular, relatively large counter-sunk holes —2— are stamped or bored. These holes may either be terraced, as shown in the drawing, or have a conical form. In the drawing each of the toe-plates —1— is shown provided with two such holes, if desired however three or more holes may be used for each plate. In said holes —2— circular discs —3— are loosely placed, in which discs holes —4— for the fastening-screws —5— are eccentrically bored.

It will be seen, that by loosening the screws —5— and turning the discs —3— the ears may be placed in any desired position (as for instance the position shown by dotted lines in Figure 1), so that the wearer without difficulty and displacement of screws, may easily adjust the ears in proper position to his boots and then lock the same in this position by simply tightening the screws —5—. It may be convenient to provide the discs —3— with apertures or depressions —6— in which a pointed member may be inserted in order that the discs —3— may easily be turned.

What I claim is:—

1. A fastening device for ski-ears comprising a toe-plate having an upturned flange, said plate being provided with a circular aperture, a disk cooperating with said aperture, and means for securing said disk to the ski, said means being positioned eccentrically with respect to said aperture to permit adjustment of the plate.

2. A fastening device for ski-ears comprising a toe-plate having an upturned flange, said plate being provided with a countersunk circular aperture, a disk having an under surface corresponding to the surface of said countersunk aperture for cooperation therewith, and a fastening member for securing said disk to the ski, said member permitting rotation of the disk about the said member and being positioned eccentrically with respect to said aperture to permit adjustment of the plate.

In testimony whereof I have signed my name to this specification.

RASMUS BERGE.